United States Patent [19]

Detmer

[11] 4,184,779
[45] Jan. 22, 1980

[54] STIRRING DEVICE

[76] Inventor: Charles Detmer, R.R. 2, Box 241, Troy, Mo. 63379

[21] Appl. No.: 944,715

[22] Filed: Sep. 22, 1978

[51] Int. Cl.² .............................................. B01F 7/18
[52] U.S. Cl. .................................... 366/282; 366/286; 99/348
[58] Field of Search .................. 99/348; 366/282, 281, 366/283, 284, 285, 286, 605

[56] References Cited

U.S. PATENT DOCUMENTS

| 2,745,644 | 5/1956 | Behren | 366/282 |
| 3,011,768 | 12/1961 | Clark | 366/282 |
| 3,357,685 | 12/1967 | Stephens | 99/348 |
| 3,810,605 | 5/1974 | Lambert | 366/282 |

*Primary Examiner*—Robert W. Jenkins
*Attorney, Agent, or Firm*—Rogers, Eilers & Howell

[57] ABSTRACT

An automatic stirring device for stirring the contents of a cooking utensil includes a plurality of support arms. The support arms have insert pads to grip the sides of a cooking utensil. An agitator with a center post and agitator blades extends downward into the cooking utensil and a motor, mounted in one of the support arms with a drive shaft driving a central gear, rotates the agitator. One of the insert pads is slidably mounted to its support arm and may be operated to exert an inward force against the side of the cooking utensil to retain the stirring device on the utensil. A support pin may be screwed into the outer end of each support arm to prevent rotation of the stirring device about the cooking utensil by contacting the handle of the utensil and also to support the stirring device in a bath of soapy water for automatic cleaning. The agitator blades are adjustable to fit various sized utensils.

10 Claims, 6 Drawing Figures

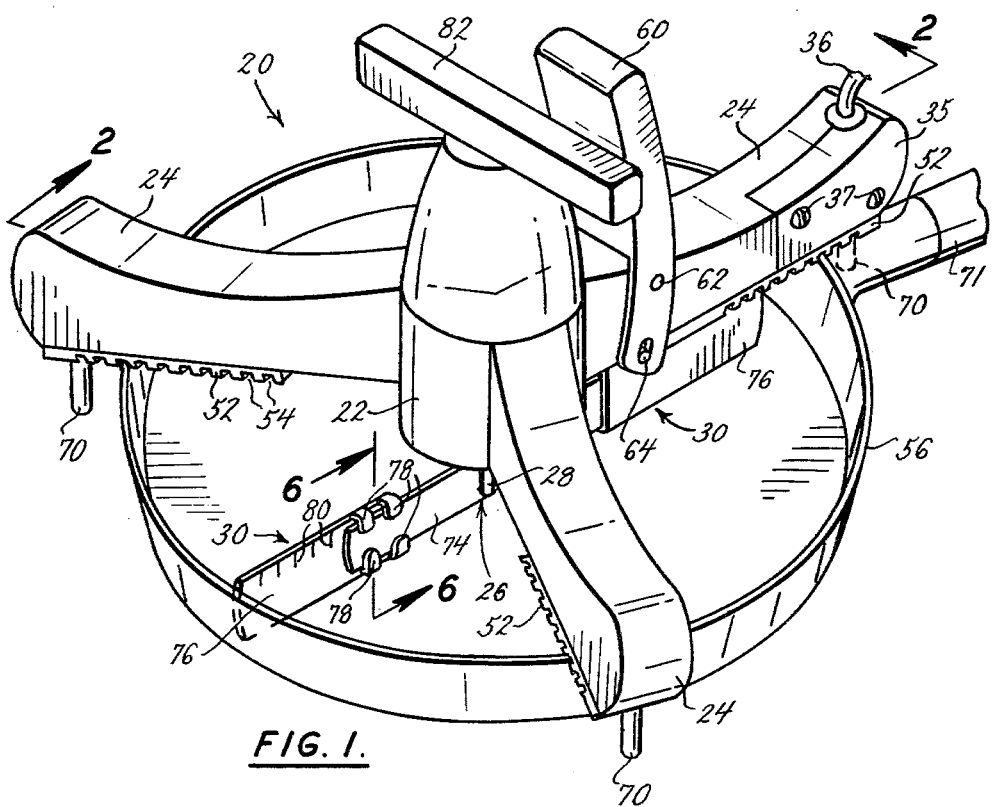
FIG. 1.
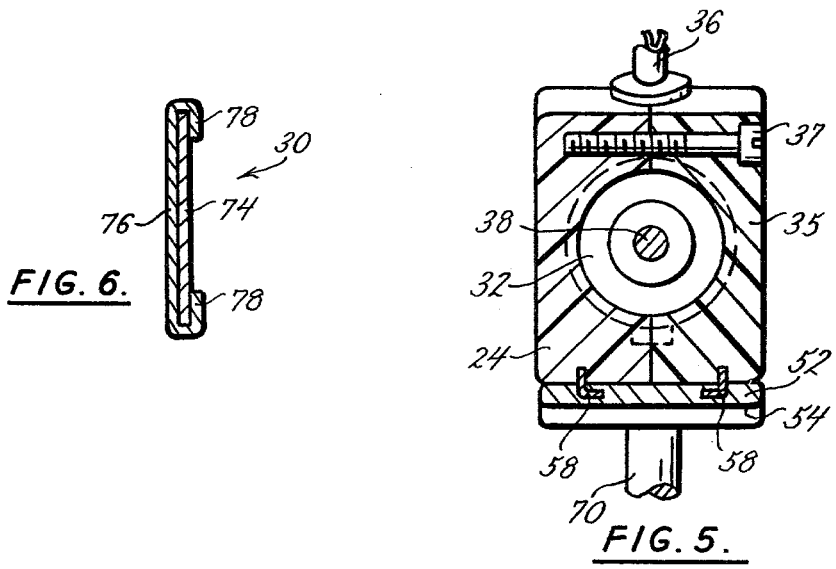
FIG. 6.
FIG. 5.

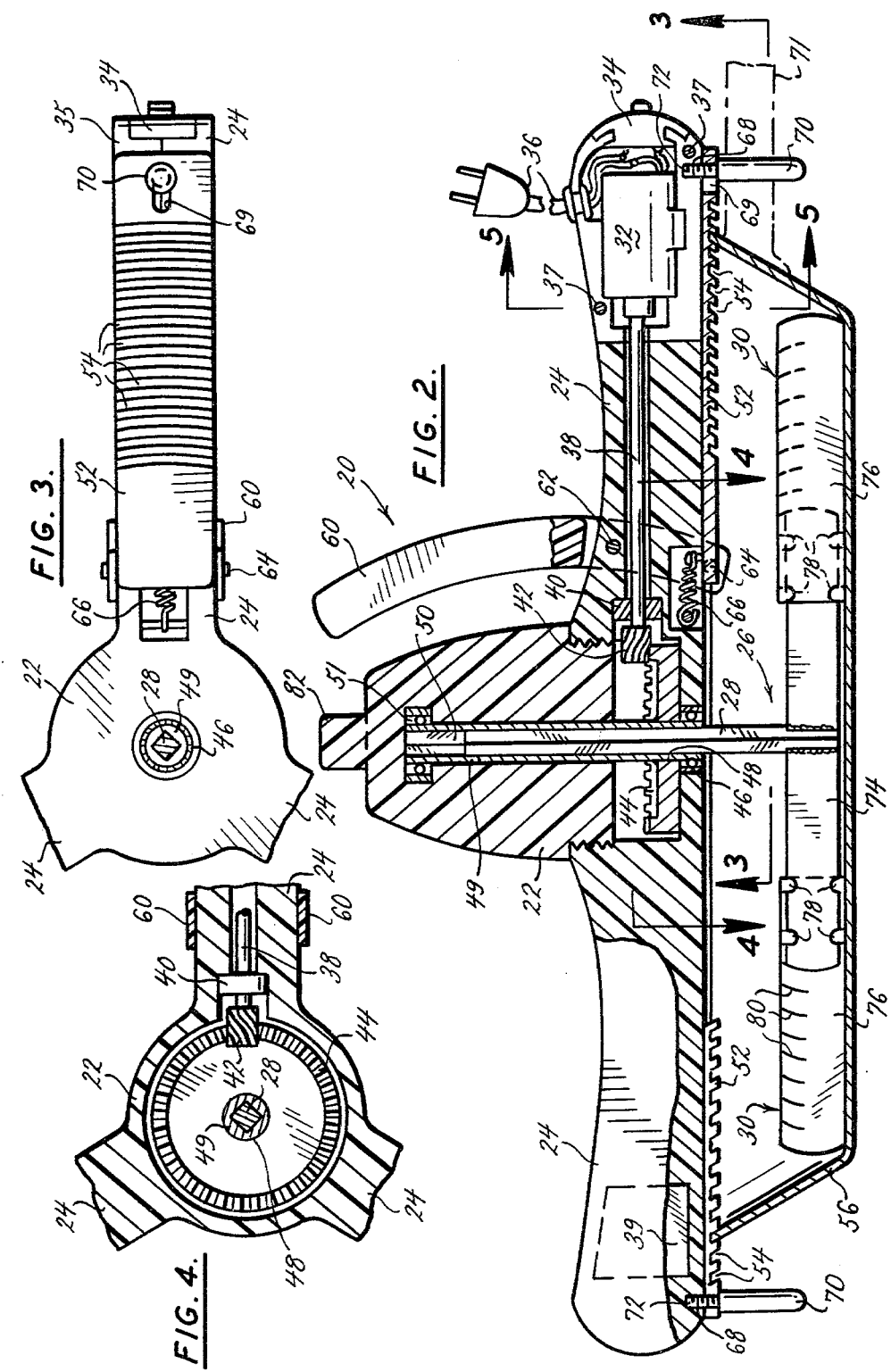

4,184,779

STIRRING DEVICE

BACKGROUND AND SUMMARY

Many recipes for the preparation and cooking of food call for continuous stirring while it is being simmered or cooked. This is usually required in the preparation of sauces, soups or the like which must be slowly heated as they have a tendency to scald or burn. Many of these sauces or soups are prepared with the use of milk or other ingredients which have a tendency to lose their taste and develop unpleasant characteristics if they are improperly prepared. A slow and continuous stirring of these foods may make all the difference in whether an excellent dish results, instead of one that is lumpy, containing cold chunks of unmixed ingredients, with an overheated or scalded skin formation floating on its surface.

Unfortunately, a cook preparing a meal can devote only a limited amount of attention to each of several dishes which he may be preparing simultaneously. This effectively limits the time and care a cook can take in the preparation of one of these dishes. Hence, a cook may decide not to make these types of dishes or may make them but produce inferior food.

To solve this problem, applicant has developed an automatic stirring device which can be fitted directly on a cooking utensil such as a frying pan or the like and which will continuously stir the contents thereof at a preselected speed.

Applicant's device generally includes an overall housing structure with one or more support arms to rest on a cooking utensil and support it therefrom. Grippers are provided in each of the support arms and a spring bias automatically exerts a gripping force which tends to grip the sides of the utensil and prevent the stirring device from spinning as it agitates. An agitator blade is driven by a motor which has a variable speed control. The agitator blade may be adjusted to fit various sized utensils and extend completely across the bottom surface to ensure that all portions of the food are thoroughly mixed.

Applicant's device is also self cleaning as it is provided with support pins which screw into each of the support arms to support it in a shallow pan of soapy water where it may be turned on to sweep the blades through the soapy water. Likewise, the blades may be rinsed and applicant's stirring device made ready for reuse while the cook it tending to other tasks.

BRIEF DESCRIPTION OF THE DRAWINGS

FIG. 1 is a perspective view of applicant's stirring device mounted on a cooking utensil;

FIG. 2 is a cross-sectional view taken along the plane of line 2—2 in FIG. 1;

FIG. 3 is an enlarged view in section of an insert pad and support arm taken along the plane of line 3—3 in FIG. 2;

FIG. 4 is an enlarged view in section of the central drive gear and drive shaft taken along the plane of line 4—4 in FIG. 2;

FIG. 5 is an enlarged view in section of the drive motor taken along the plane of line 5—5 in FIG. 2; and FIG. 6 is an enlarged view in cross-section of an agitator blade taken along the plane of line 6—6 in FIG. 1.

DETAILED DESCRIPTION OF THE PREFERRED EMBODIMENT

Applicant's device generally includes a plurality of support arms, each of which has an insert pad mounted to its bottom surface with grooves which are adapted to receive the circular edges of a cooking utensil. One of the pads has a slide rail mounting with an operating handle and a spring bias which creates an inward pressure against the side of the cooking utensil and prevents the automatic stirring device from being accidentally knocked off the top of the utensil. An agitator is provided with a center post and a plurality of blades which extend radially outward across the bottom of the cooking utensil. The center post may be approximately square in cross section and fits through a square hole in a central drive gear which rotates in the center housing to drive the agitator. A bearing collar extends upwardly into an alignment shaft and is connected to a second bearing which aids in supporting the center post during stirring.

Each blade has two portions, one of which telescopes over the other. The outer portion has index markings to help in adjusting each blade's length to match the varying diameters of cooking utensils. The agitator is driven by the electric motor mounted in one of the support arms through a drive shaft and drive gear meshing with the central drive gear previously mentioned. Although applicant prefers the motor to be mounted in one of the support arms, it can be mounted anywhere in the device including the central housing. An electric control may be provided to select one of several speeds or to provide an infinitely variable speed for the agitator in the pan. A multi-speed drive permits applicant's device to be used to make various dishes requiring varying amounts of agitation and which have a varying viscosity. Counterbalance weights may be provided in the other support arms to adjust the center of gravity for the entire stirring device near the center housing.

The alignment shaft and the center post cooperate in allowing the agitator to settle near the bottom of the cooking utensil through the force of gravity and remain there during the stirring process. The stirring blades may be approximately an inch (2.54 centimeters) in width and constructed of stainless steel which will provide sufficient flexibility to stir most sauces and soups while also providing for a quick and easy clean up. Threaded holes are provided in the support arms and threaded pins may be screwed into these holes and used to support the stirring device in a shallow pan of soapy water or the like. Thus, applicant's automatic stirring device may also automatically clean itself by stirring through first a bath of sudsy soap water and then a bath of clean rinse water. The support pins are approximately an inch and a quarter tall (3.1750 centimeters) so as to provide sufficient clearance for the agitator blades. This procedure for cleaning applicant's stirring device does not require submersion of the drive motor or any of the electrical components, but does provide complete immersion of the agitator blades. The support pins are also sufficiently strong to engage the handle of the cooking utensil and prevent rotation of the stirring device as it stirs the contents of the utensil.

More specifically, applicant's invention of a stirring device 20 includes a center housing 22 and three support arms 24. An agitator 26 has a center post 28 and two or more agitator blades 30. A drive motor 32 is mounted at the outer end of a support arm 24 and a control 34 and supply cord 36 control the operation thereof. A removable access door 35 is held in place over the motor 32 by screws 37. Counterweights 39 are provided in each of the other support arms 24 to balance the stirring device 20 about center housing 22. The drive motor 32 has a drive shaft 38 which extends radially inward along the interior of the support arm 24 and which has a bearing 40 supporting its inner end. A drive gear 42 is mounted on the end of the drive shaft 38 and meshes with a circular central drive gear 44 which is mounted at the bottom end of the center housing 22 by means of a bearing 46. A bore 48 is formed in the center of drive gear 44 and is sized to receive a bearing collar 49 which is secured thereto with a press fit, weld or the like. The bearing collar 49 extends upwardly and is likewise secured to a second bearing 51 and is rotatably supported thereby. The interior of bearing collar 49 forms an alignment shaft 50 which has a square cross-sectional shape to receive center post 28 of the agitator 26. The center post 28 is thus rotatably driven by bearing collar 49 which is supported by bearings 46, 51 from center housing 22.

Insert pads 52 are provided along the bottom edges of each of the support arms 24. Each insert pad 52 has a series of arcuate grooves 54 formed therein for fitting over the top edges of a cooking utensil 56, as is best shown in FIGS. 1 and 2. One of said insert pads 52 is mounted on slide rails 58 which permits the insert pad 52 to be moved in a radial direction along the bottom of the support arm 24. An operating handle 60 is mounted by a pivot pin 62 and has a swivel connection 64 to the insert pad 52 to aid in moving the insert pad. A spring 66 resists outward movement of insert pad 52. Threaded openings 68 are provided near the outer end of each support arm 24 and receive support pins 70 which have matching threads 72. A slot 69 is provided in insert pad 52 to accommodate sliding movement of said pad without interferring with its associated support pin 70. Support pins 70 may be approximately an inch and a quarter high (3.1750 centimeters) so as to provide sufficient clearance for the agitator blades 30 to revolve freely when the stirring device 20 is placed upon a flat surface or in a pan of water. Support pins 70 are also sufficiently sturdy to contact the handle 71 of utensil 56 and hold stirring device 20 in position during operation.

The agitator blades 30 include an inner portion 74 and an outer portion 76. Tabs 78 are provided on the outer portion 76 and secure the outer portion 76 in a sliding relationship to the inner portion 74. Index marks 80 are provided along the outer portion 76 and aid in synchronizing the extension of the outer portion 76 for all of the blades 30. Thus, it is relatively easy to adjust each of the agitator blades 30 to a common length to fit a circular cooking utensil 56. A lifting handle 82 is provided at the top of center housing 22 and provides a convenient place to grasp the stirring device 20 and move it onto or off of a cooking utensil 56.

Operation

Applicant's stirring device 20 may be quickly and easily attached to a cooking utensil 56, set in operation and will automatically stir the contents of the cooking utensil 56 while the cook tends to other dishes which he may be preparing at the same time. The cook will first grasp the lifting handle 52 and examine the agitator blades 30 and adjust them inwardly to ensure that they will fit inside the diameter of the cooking utensil to be fitted with the stirring device 20. Then, operating handle 60 is moved towards the center housing 22, preferably by the thumb so as to slide the insert pad 52 on the corresponding support arm 24 outwardly and away from center housing 22. The stirring device 20 may then be lowered onto the sides of the cooking utensil 56 with the center housing 22 being in the approximate center thereof. The arcuate grooves 54 of the insert pads 52 are designed to slide over the rim of the cooking utensil 56 as is best shown in FIG. 2. As the stirring device 20 is lowered into the pan, the center post 28 of the agitator 26 automatically lowers to bring the agitator blades 30 into contact with the bottom of the cooking utensil 56. After the stirring device 20 has been mounted on the top of the cooking utensil 56 with the arcuate grooves 54 inserted over the sides, the operating handle 60 may be released to create a slight inward pressure tending to maintain the stirring device 20 in position atop utensil 56. Thus, slight jars or accidental bumping against either the stirring device 20 or cooking utensil 56 will not cause separation of the two.

The agitator blades 30 may then be readjusted outwardly to cover the entire bottom surface of the utensil 56 to ensure complete stirring. If cooking utensil 56 contains the food before the stirring device 20 is applied thereto, the agitator blades 30 must be adjusted before inserting them into the cooking utensil 56. At least one of the support arms 24 should be positioned adjacent a handle of the cooking utensil 56 such that a support pin 70 extending downwardly therefrom will contact it and resist movement of the stirring device 20 about the utensil 56 as the agitator 26 is driven. For example, if clockwise rotation of the agitator blades 30 is chosen, then the support pins 70 should be positioned to the right side of the utensil handle 71, as viewed by the cook as he holds utensil 56.

After the stirring device 20 is properly secured to the utensil 56, the electrical cord 36 may be plugged in and the control 34 adjusted to provide the desired speed of rotation. Although not shown, additional electrical controls may be provided to include automatic timing, or various routines or patterns of stirring from rapid to slow and back to rapid again, automatically.

Removal of the stirring device 20 is accomplished by reversing the installation procedure described above. Stirring device 20 may be cleaned by inserting all of the support pins 70 into the support arms 24 and setting stirring device 20 in approximately an inch and a quarter (3.1750 centimeters) of soapy water and then turning it on. This will cause the agitator blades 30 to sweep through the soapy water and clean themselves automatically. The blades 30 may then be rinsed using a shallow pan of clean water and the stirring device 20 is then ready for reuse.

Various modifications and changes would be obvious to one of ordinary skill in the art and are taught by applicant's invention. Applicant intends that the scope of his invention be limited only by the claims appended hereto.

I claim:

1. A device for automatically stirring the contents of a cooking utensil comprising a support having means to grip the side of the cooking utensil, an agitation means for extending into the cooking utensil, means to adjust said agitation means to fit various sized cooking utensils, means to drive said agitation means and thereby stir the contents of a cooking utensil including a motor mounted in an outer end of said support arm, a center housing, a drive shaft extending radially inward, a first drive gear mounted on the inboard end of said drive shaft, a second drive gear centrally disposed in said center housing, said second drive gear meshing with said first drive gear in a driving relationship, means defining a bore in said second drive gear, a bearing collar secured to said bore, said agitation means having a center post extending upwardly into said bearing collar, said bearing collar having means for engaging said center post in a driving relationship, and means to prevent rotation of said device about the cooking utensil as said agitation means is driven.

2. The device of claim 1 further comprising a plurality of support arms, each of said support arms having means to grip the side of the cooking utensil.

3. The device of claim 2 further comprising support pins having a threaded end wherein each of said support arms includes means defining a threaded opening for receiving and retaining said support pins, said support pins being sufficiently long to support said stirring device from a surface and provide sufficient clearance between the agitation means and said surface to permit unrestricted movement thereof.

4. The device of claim 3 wherein said threaded opening is substantially near the outer end of the support arm so that a support pin mounted therein will overhang the side of the cooking utensil and contact the handle thereof to prevent rotation of the support arms about the cooking utensil.

5. The device of claim 2 wherein the gripping means includes a grooved insert pad mounted to the bottom of each of said support arms, said grooves being adapted to receive a side of a cooking utensil, at least one of said insert pads having means to create an inward pressure between said insert pad and the side of a cooking utensil to thereby secure the stirring device thereto.

6. The device of claim 5 wherein the pressure creating means includes means to slide an insert pad with respect to its associated support arm, a handle extending upwardly from said slidable insert pad and pivoted about said associated support arm, and a spring extending between said support arm and said handle to thereby apply an inwardly directed force on said insert pad.

7. The device of claim 1 wherein the agitation means includes a plurality of blades, said blades being attached to and extending radially outward from said center post.

8. The device of claim 7 wherein the agitation adjusting means includes blades having an inner portion and an outer portion, said outer portion being slidably secured to said inner portion to permit telescoping of said outer portion about said inner portion and thereby adjust the radial extension of said blade.

9. The device of claim 1 wherein the bearing has means defining an alignment shaft for slidably receiving and supporting the center post, said alignment shaft permitting perpendicular movement of said center post while remaining in a driving relationship thereto to thereby allow said center post to freely move into and out of said alignment shaft.

10. A device for automatically stirring the contents of a cooking utensil comprising a center housing, three support arms approximately equally spaced about said center housing, an electrical drive motor mounted in an outer end of one of said support arms, a control for said motor providing for a plurality of selectable motor speeds, a motor drive shaft extending radially inward along the interior of said one support arm, bearing means supporting an inner end of said motor drive shaft, a first drive gear mounted on said inner end, a second drive gear, bearing means supporting said second drive gear from the center housing, means defining a bore in said second gear, a bearing collar secured to said bore and extending upwardly therefrom, a bearing means secured to the upper end of said bearing collar and supporting same from the center housing, said bearing collar having means forming an alignment shaft with a square cross-sectional area approximating a square, an agitation means including a center post having an approximately square cross section to be slidably received by said alignment shaft, three blades attached to and extending radially outward from said center post, each of said blades having an inner portion and an outer portion, said outer portion having tabs which overlap said inner portion and slidably retain said outer portion thereto, a plurality of index markings on said outer portions to aid in determining the amount of overlap therebetween, each of said support arms having an insert pad mounted to its bottom surface, each of said pads having a plurality of arcuate grooves, one of said pads having a slide rail mounting to permit sliding movement relative to its associated support arm, an operating handle pivotally connected to an end of said one pad, a spring extending between said handle and said support arm to resist outward movement of said one pad and thereby provide a gripping force to the sides of the cooking utensil, means defining a threaded opening in the outer end of each of said support arms, three support pins, each of said pins having threads to match and line up with said threaded openings and secure said pins to said support arms, said pins being equal in length and of sufficient length to support said stirring device from a flat surface and permit unrestricted rotation of said blades, said pins having sufficient rigidity and length to contact the handle of the cooking utensil to prevent rotation of the stirring device about the cooking utensil as said agitation means is driven, and a lifting handle mounted atop said center housing, said operating handle being positioned for convenient operation by a user's thumb as the lifting handle is gripped.

* * * * *